US012560273B2

(12) United States Patent
Taets von Amerongen et al.

(10) Patent No.: US 12,560,273 B2
(45) Date of Patent: Feb. 24, 2026

(54) INSULATING CONCRETE SHELL

(71) Applicant: ANDRITZ Metals Germany GmbH, Hemer (DE)

(72) Inventors: Dankmar Taets von Amerongen, Lüdenscheid (DE); Boris Kofmann, Krefeld (DE); Gerhard Schlich, Essen (DE)

(73) Assignee: ANDRITZ Metals Germany GmbH, Hemer (DE)

( * ) Notice: Subject to any disclaimer, the term of this patent is extended or adjusted under 35 U.S.C. 154(b) by 443 days.

(21) Appl. No.: 18/546,309

(22) PCT Filed: Jan. 20, 2022

(86) PCT No.: PCT/EP2022/051171
§ 371 (c)(1),
(2) Date: Aug. 14, 2023

(87) PCT Pub. No.: WO2022/189051
PCT Pub. Date: Sep. 15, 2022

(65) Prior Publication Data
US 2024/0301986 A1    Sep. 12, 2024

(30) Foreign Application Priority Data

Mar. 9, 2021    (AT) .............................. A 50169/2021

(51) Int. Cl.
*F16L 59/12*    (2006.01)
*F16L 59/02*    (2006.01)
(Continued)

(52) U.S. Cl.
CPC ............. *F16L 59/12* (2013.01); *F16L 59/024* (2013.01); *F27D 1/0003* (2013.01); *F27D 1/045* (2013.01); *F27D 1/141* (2013.01)

(58) Field of Classification Search
CPC ....... F16L 59/12; F16L 59/024; F16L 59/025; F16L 9/08; F16L 9/085; F16L 9/153;
(Continued)

(56) References Cited

U.S. PATENT DOCUMENTS 3,781,167 A * 12/1973 Ahonen ................ F16L 59/024
432/234
4,063,573 A * 12/1977 Harting ................... F16L 59/12
138/155
(Continued)

FOREIGN PATENT DOCUMENTS

DE        8407841 U1      6/1984
EP        0062500 A1      10/1982
(Continued)

OTHER PUBLICATIONS

International Search Report mailed May 6, 2022 for International Patent Application No. PCT/EP2022/051171.
(Continued)

*Primary Examiner* — David Bochna
(74) *Attorney, Agent, or Firm* — Alix, Yale & Ristas, LLP

(57)        ABSTRACT

An insulating concrete shell made of refractory cast concrete or refractory tamped concrete for insulating uprights or supporting tubes in a walking beam furnace or pusher-type furnace. The insulating concrete shell is shell-shaped and has a sheet metal strip on the inner side at each end, with which the insulating concrete shell can be fastened to an upright or to a supporting tube. The two sheet metal strips are connected to each other by wires, whereby the two wires are completely embedded in the cast or tamped concrete. A method for manufacturing an insulating concrete shell is also disclosed.

16 Claims, 3 Drawing Sheets

(51) Int. Cl.
| | |
|---|---|
| *F27D 1/00* | (2006.01) |
| *F27D 1/04* | (2006.01) |
| *F27D 1/14* | (2006.01) |

(58) Field of Classification Search
CPC ...... F27D 1/0009; F27D 1/0013; F27D 1/045; F27D 1/08; F27D 1/144; F27D 1/141; F27D 1/10; F27D 3/022; F27D 3/02; F27D 1/0003; F27D 1/16; F27D 1/1621; F27D 1/1626; F27D 1/0033; F27B 9/201
See application file for complete search history.

(56) References Cited

U.S. PATENT DOCUMENTS

| | | | | |
|---|---|---|---|---|
| 4,071,311 | A * | 1/1978 | Errington | F16L 59/12 |
| | | | | 432/234 |
| 4,134,721 | A | 1/1979 | Davis et al. | |
| 4,140,483 | A * | 2/1979 | Errington | F27D 1/045 |
| | | | | 138/149 |
| 4,386,630 | A | 6/1983 | Gapinski | |
| 4,732,796 | A | 3/1988 | Schatschneider | |
| 6,575,738 | B1 * | 6/2003 | Nguyen | F27D 3/022 |
| | | | | 138/149 |
| 7,628,611 | B2 * | 12/2009 | Beiter | F27D 1/0006 |
| | | | | 138/149 |

FOREIGN PATENT DOCUMENTS

| | | |
|---|---|---|
| GB | 2125926 B | 9/1985 |
| WO | 2010131213 A1 | 11/2010 |

OTHER PUBLICATIONS

International Preliminary Report on Patentability dated Feb. 2, 2023 for International Patent Application No. PCT/EP2022/051171.

* cited by examiner

INSULATING CONCRETE SHELL

BACKGROUND

The disclosed embodiments concern an insulating concrete shell made of refractory cast concrete or of refractory tamped concrete for insulating uprights or supporting tubes in a walking beam furnace or pusher-type furnace. Such insulating concrete shells are shaped in such a way that they can completely encase the tube to be insulated. Two semi-cylindrical insulating concrete shells are often placed around a tube for this purpose. However, since the tubes or uprights can also have an oval or angular cross-section, the shapes of the insulating concrete shells are adapted accordingly. In some embodiments, three or more insulating concrete shells are needed to completely encase a tube or an upright.

The insulating concrete shell disclosed herein has a sheet metal strip on the inner side at the respective end, via which the insulating concrete shell is fastened to the upright or the supporting tube.

Also disclosed herein is a method for manufacturing an insulating concrete shell.

SUMMARY

In heat treatment furnaces such as walking beam furnaces or pusher-type furnaces, water- or steam-cooled support tubes or uprights are often used to support the metallic workpieces during heat treatment. In order to reduce the heat loss of the furnace due to tube cooling, the tubes are provided with suitable insulating jackets made of ceramic or fire-resistant material. The service life of this raw insulation is limited, so the ovens are shut down at regular intervals and the insulation is replaced.

Conventional insulating concrete shells have a rolled sheet 1 on the inner side, adapted to the tube diameter of the supporting tube (see FIGS. 1 and 2). A series of anchors (slotted pins) 2 are welded onto the sheet 1. A ceramic fibre mat 3 is placed on the rolled sheet 1 and the slotted pins 2 projecting through the fibre mat 3 are spread open so that the fibre mat 3 is thereby fixed to the sheet 1.

The ceramic fibre mat 3 serves to reduce the thermal conductivity of the insulating concrete shell 5.

The casing of the insulating concrete shell 5 is then made of cast or tamped refractory concrete 4. The sheet 1 and the anchors 2 contribute significantly to the strength of the insulating concrete shell 5.

A state-of-the-art insulating concrete shell is also described in WO 2010/131213.

To install the insulating concrete shells, the rolled sheet 1 is welded or screwed to the support tubes or uprights of the oven.

The following problems occur with conventional insulating concrete shells:

The large number of anchors (slotted pins) welded to the sheet metal result in increased thermal conductivity as compared to an application without such anchors.

The casting process contaminates (infiltrates) the ceramic fibre mat with the casting water and compresses it, so that this also increases the thermal conductivity.

DE 8 407 841 U1 discloses a refractory casing for elongated components in furnaces made of mineral or ceramic fibres. This casing also includes two circular arc-shaped brackets, which have two narrow roughly semi-circular brackets connected to each other in a hinge-like manner.

DE2354883 discloses a semi-cylindrical insulating concrete shell made of ceramic material. In contrast to the insulating concrete shell described above, only two metal strips are provided inside, via which the two insulating concrete shells can be interlocked. V-shaped reinforcement links (anchors) made of corrosion-resistant steel are welded to the strips. The two strips and the reinforcing links are cast with the ceramic material. The use of two narrow metal strips instead of a large-area sheet and the reduced number of reinforcing links keep the thermal conductivity of the insulating concrete shell low, but the mechanical stability of this insulating concrete shell is lower due to the lack of a metallic support structure.

The disclosed embodiments are therefore based on the task of providing an insulating concrete shell which should have the lowest possible thermal conductivity on the one hand and the greatest possible stability on the other.

In the disclosed insulating concrete shell, the two sheet metal strips, which are bent into a semicircle, are connected to each other by wires, whereby the two wires are completely embedded in the cast or tamped concrete.

Due to the sheet metal strips used, the thermal conductivity of the insulating concrete shells is considerably reduced compared to insulating concrete shells with a continuous sheet metal jacket. By connecting the two sheet metal strips via the wires, the thermal conductivity is also kept low and, in addition, a good stability of the insulating concrete shell is achieved. Preferably, the sheet metal strips are connected to each other via two wires, which can have an elongated u-shape.

It is very advantageous if the wires are only welded to the ends of the sheet metal strips. This results in a very small contact area with the sheet metal strips and thus low thermal conductivity.

Preferably, cross wires are attached along the wires so that the two sheet metal strips are connected to each other via grid-like wire anchors. This increases the stability of the insulating concrete shell.

As disclosed herein, there is a recess on the inner side of the insulating concrete shell in the area between the two sheet metal strips, into which a fibre mat is inserted. The insulating property can be increased by the inserted fibre mat. In addition, this design allows the fibre mat to be inserted after the casting/tamping process and after curing, so that the fibre mat can no longer be damaged by the casting water.

The disclosed embodiments also relate to a method of manufacturing an insulating concrete shell comprising the following steps:

two sheet metal strips are bent according to the shape of an upright or a support tube so that they can be put against the upright or the support tube during the later assembly;

the two bent sheet metal strips are connected by at least two wires;

the interconnected sheet metal strips are placed in a casting or tamping mould with a recess, which may be semi-cylindrical on the inner side between the two sheet metal strips, for example;

the casting or tamping mould is filled with refractory concrete;

after curing, the manufactured component is removed from the mould;

a ceramic fibre mat is inserted into the recess on the inner side.

The inserted ceramic fibre mat can no longer be deformed by the water-containing refractory concrete, so that the insulating properties are additionally improved.

BRIEF DESCRIPTION OF THE DRAWINGS

The following describes the state-of-the-art standard and an exemplary embodiment of the invention on the basis of drawings. In these drawings.

DETAILED DESCRIPTION

Figure 1:
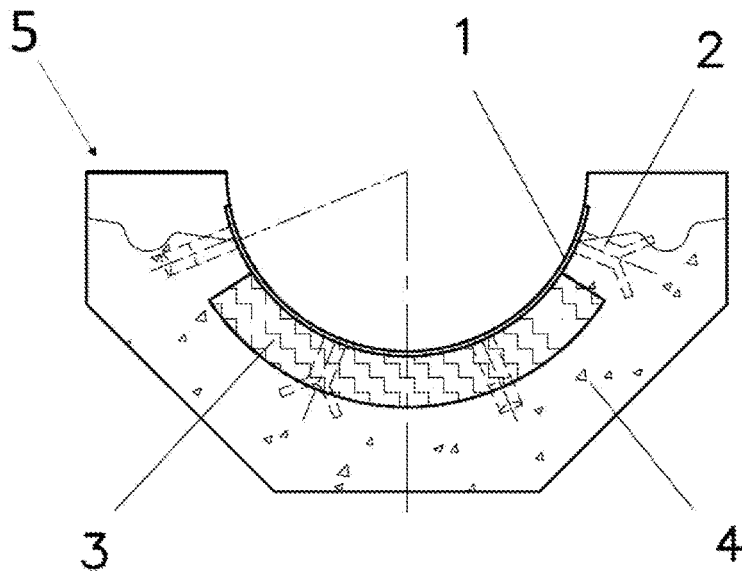
FIG. 1 shows a schematic cross-section through an insulating concrete shell according to the state-of-the-art.

The same reference numerals in the individual Figures refer to the same components in each case.

Figure 2:
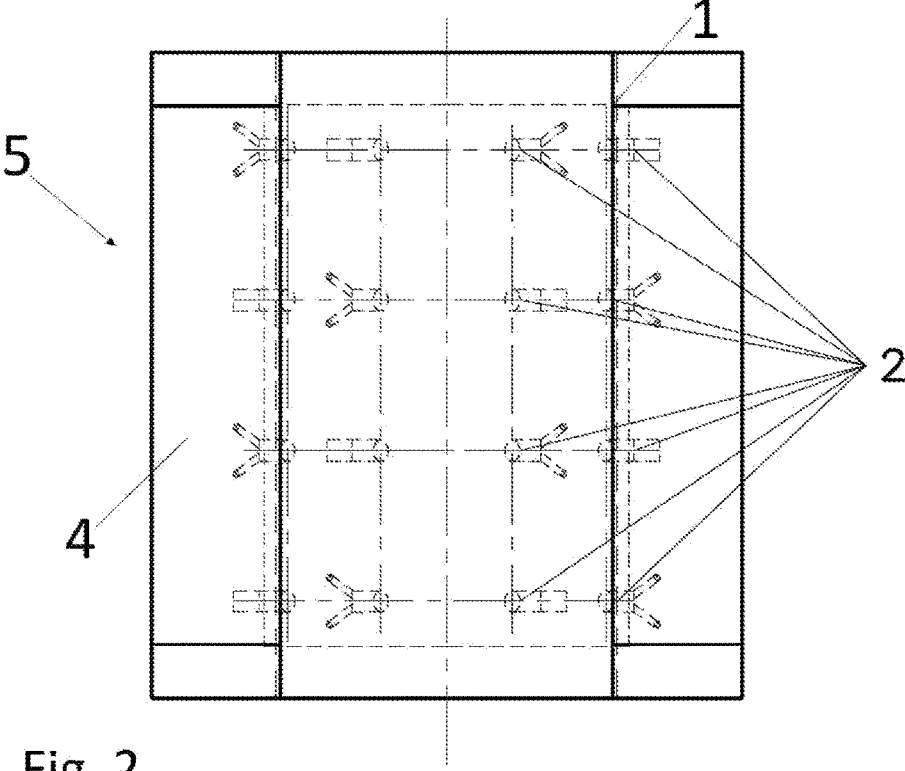
FIG. 2 shows a longitudinal section through the insulating concrete shell of FIG. 1.

The insulating concrete shell 5 shown in FIGS. 1 and 2 illustrates an embodiment according to the state-of-the-art as already explained in the introduction above.

Figure 3:
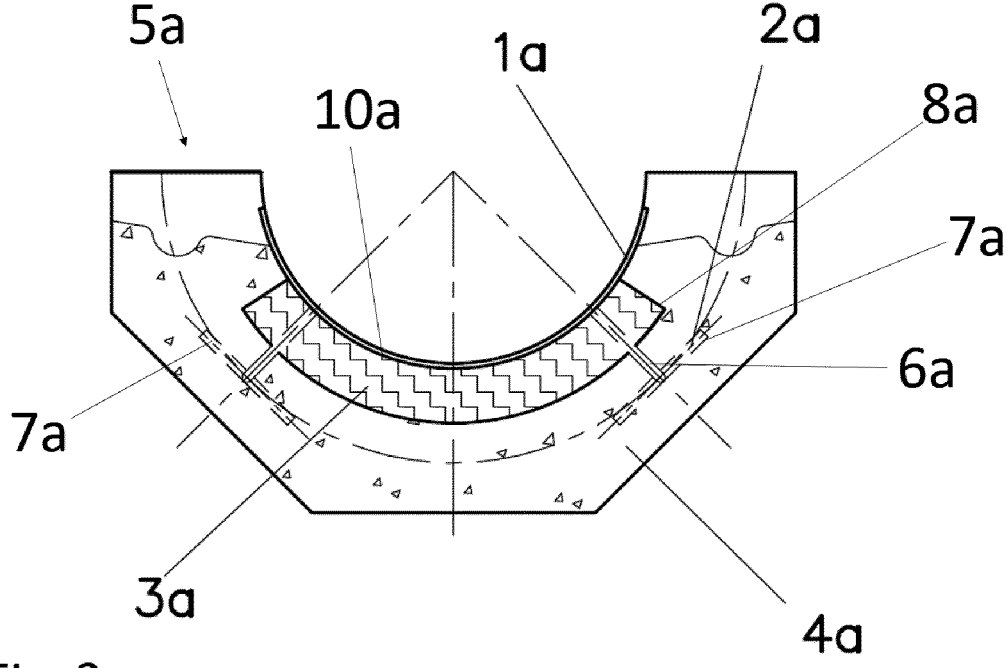
FIG. 3 shows a schematic cross-section through an exemplary embodiment of the insulating concrete shell.
Figure 4:
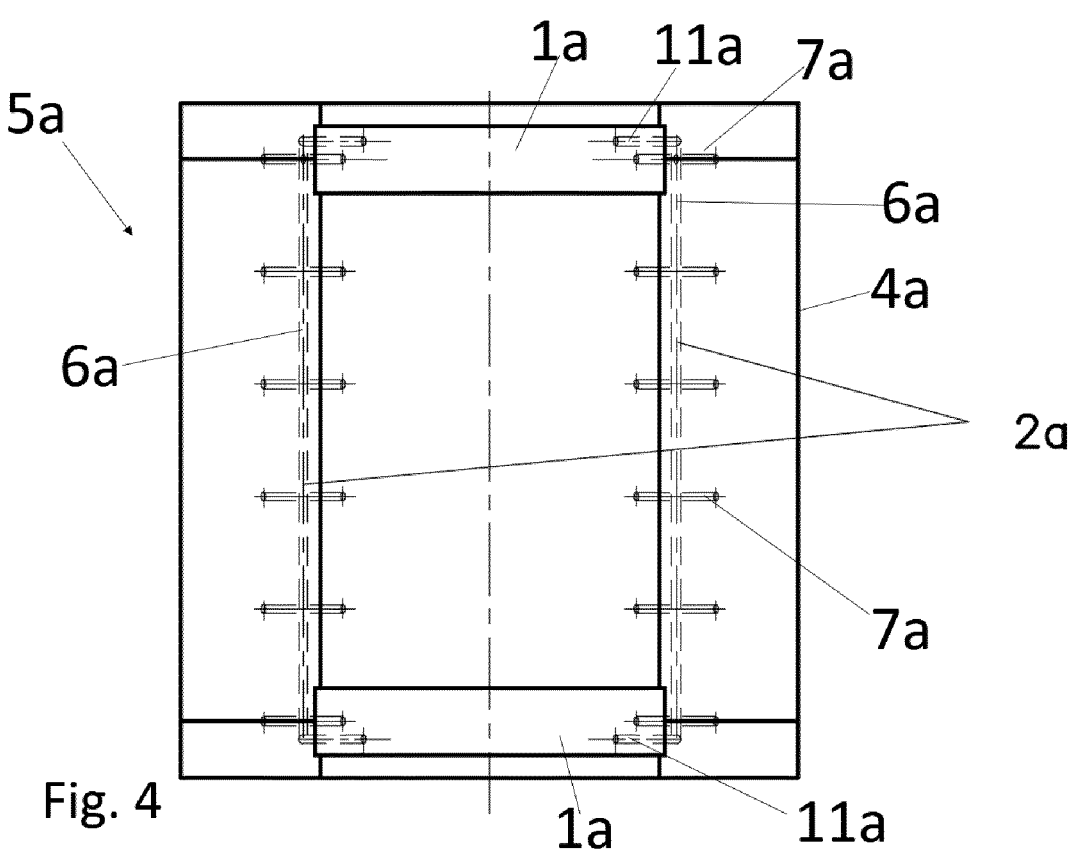
FIG. 4 shows a longitudinal section through the insulating concrete shell of FIG. 3.

An insulating concrete shell 5a according to the disclosure is shown in the cross-section in FIG. 3. FIG. 4 shows a side section view of the insulating concrete shell 5 according to FIG. 1.

Figure 5:
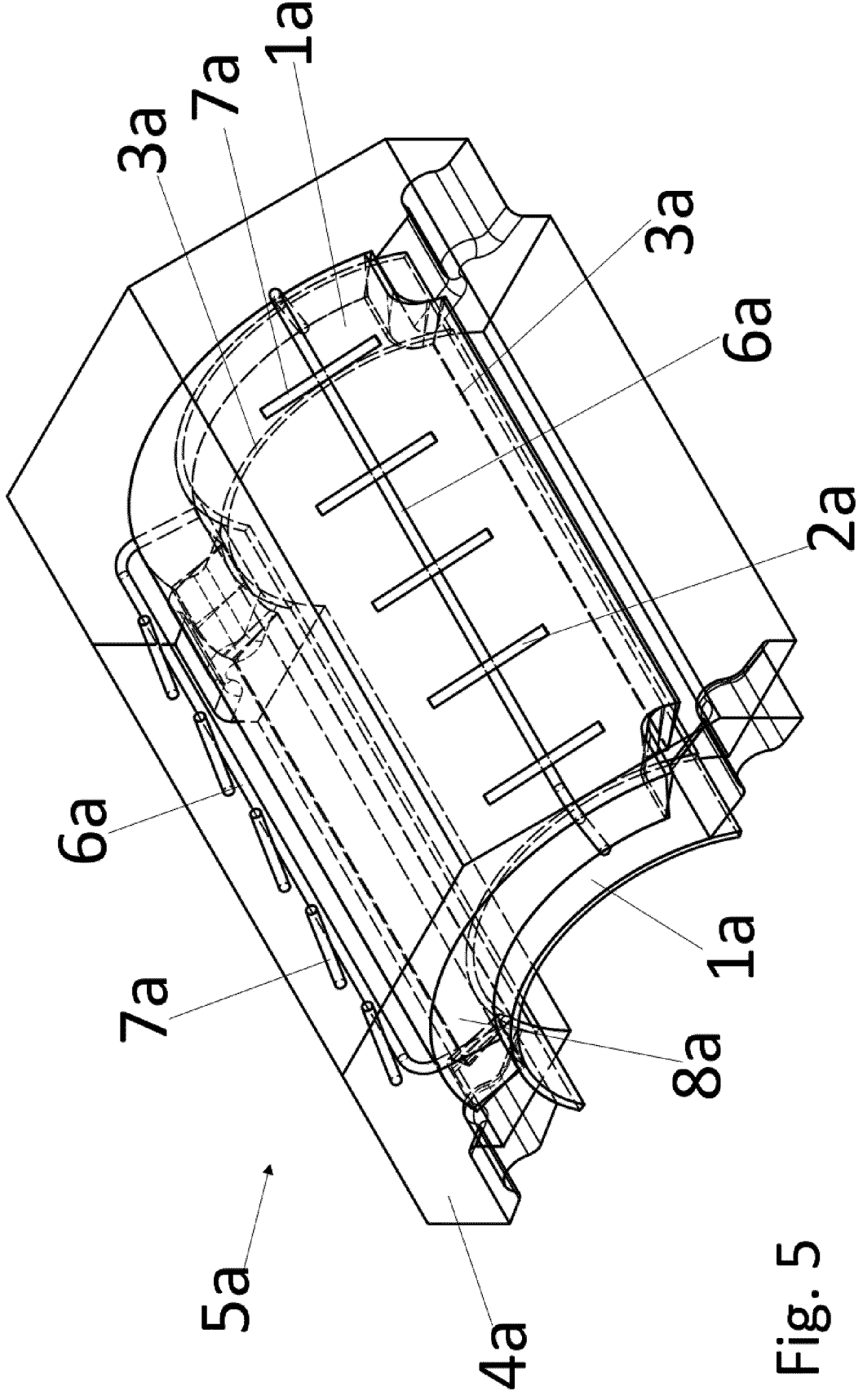
FIG. 5 shows perspective view of the insulating concrete shell according to the invention.

On the inner side 10a are shown the two sheet metal strips 1a bent into a semicircle. Two wires 6a are welded to the sheet metal strip 1a. The two wires 6a are bent in a U-shape and welded to the wire ends 11a of the sheet metal strips 6a. Cross wires 7a are fixed along the wires 6a, and in the present exemplary embodiment extend substantially in the circumferential direction of the insulating concrete shell 5a. The wires 6a and the cross wires 7a form grid-like wire anchors 2a. The wires 6a and the cross wires 7a are embedded in cast or tamped concrete 4a. On the inner side 10a in the area between the sheet metal strips 6a, a recess 8a is provided in the cast or tamped concrete 4a. A ceramic fibre mat 3a is inserted into this recess 8a. The U-shape of the wires 6a is clearly visible in FIG. 5.

REFERENCE NUMERALS

1 Sheet metal
2 Anchors (slotted pins)
3 Fibre mat
4 Poured/tamped concrete
5 Insulating concrete shell
1a Sheet metal strip
2a Wire anchor
3a Fibre mat
4a Poured/tamped concrete
5a Insulating concrete shell
6a Wires
7a Cross wires
8A Recess
10a Inner side
11a Wire end

The invention claimed is:
1. An insulating concrete shell (5a) made of refractory cast concrete or refractory tamped concrete (4a) for insulating uprights or supporting tubes in a walking beam furnace or pusher-type furnace, the shell (5a) being shell-shaped, comprising:

a first metal strip (1a) bent into a substantially semicircular shape and arranged on an inner side (10a) at a first end of the insulating concrete shell (5a);

a second metal strip (1a) bent into a substantially semicircular shape and arranged on the inner side (10a) at an opposite second end of the insulating concrete shell (5a), the first and second metal strips (1a) being configured for fastening the insulating concrete shell (5a) to the upright or the supporting tube;

a recess (8a) in an area between the first and second metal strips (1a); and a fibre mat (3a) inserted into the recess (8a), wherein the first and second metal strips (1a) are connected to one another by wires (6a) with two wires (6a) completely embedded within the cast or tamped concrete (4a).

2. The insulating concrete shell (5a) according to claim 1, wherein the wires (6a) are welded at their respective ends (11a) to the respective sheet metal strips (1a).

3. The insulating concrete shell (5a) according to claim 2, wherein the first and second metal strips (6a) are connected to each other by a total of two wires (6a).

4. The insulating concrete shell (5a) according to claim 2, wherein the wires (6a) are bent into a substantially U-shape.

5. The insulating concrete shell (5a) according to claim 2, comprising cross wires (7a) along the wires (6a) such that the two metal strips (1a) are connected to each other via grid-shaped wire anchors (2a).

6. The insulating concrete shell (5a) according to claim 5, wherein the cross wires (7a) are completely embedded in the cast or refractory tamped concrete (4a).

7. The insulating concrete shell (5a) according to claim 1, wherein the first and second metal strips (6a) are connected to each other by a total of two wires (6a).

8. The insulating concrete shell (5a) according to claim 7, wherein the wires (6a) are bent into a substantially U-shape.

9. The insulating concrete shell (5a) according to claim 8, comprising cross wires (7a) along the wires (6a) such that the two metal strips (1a) are connected to each other via grid-shaped wire anchors (2a).

10. The insulating concrete shell (5a) according to claim 9, wherein the cross wires (7a) are completely embedded in the cast or refractory tamped concrete (4a).

11. The insulating concrete shell (5a) according to claim 7, comprising cross wires (7a) along the wires (6a) such that the two metal strips (1a) are connected to each other via grid-shaped wire anchors (2a).

12. The insulating concrete shell (5a) according to claim 11, wherein the cross wires (7a) are completely embedded in the cast or refractory tamped concrete (4a).

13. The insulating concrete shell (5a) according to claim 1, wherein the wires (6a) are bent into a substantially U-shape.

14. The insulating concrete shell (5a) according to claim 1, comprising cross wires (7a) along the wires (6a) such that the two metal strips (1a) are connected to each other via grid-shaped wire anchors (2a).

15. The insulating concrete shell (5a) according to claim 14, wherein the cross wires (7a) are completely embedded in the cast or refractory tamped concrete (4a).

16. A method of producing a shell-shaped insulating concrete shell (5a), comprising:

bending two sheet metal strips (1a) into respective semicircular shapes to the shape of an upright or a supporting tube;

connecting the two bent sheet metal strips (1*a*) to one another via at least two wires (6*a*) to form interconnected metal strips;

placing the interconnected sheet metal strips into a casting or tamping mould configured to allow formation of a substantially shell-shaped component with a recess (8*a*) on an inner side (10*a*) between the two sheet metal strips (1*a*);

filling the casting or tamping mould (4*a*) with refractory concrete;

allowing the refractory concrete to cure to form a manufactured component;

removing the manufactured component from the mould;

inserting a ceramic fibre mat (3*a*) into the recess (8*a*) at the inner side (10*a*).

* * * * *